May 25, 1926.
C. E. HOUX
SHOCK ABSORBER
Filed June 6, 1924
1,586,510
2 Sheets-Sheet 1
Fig. 1.
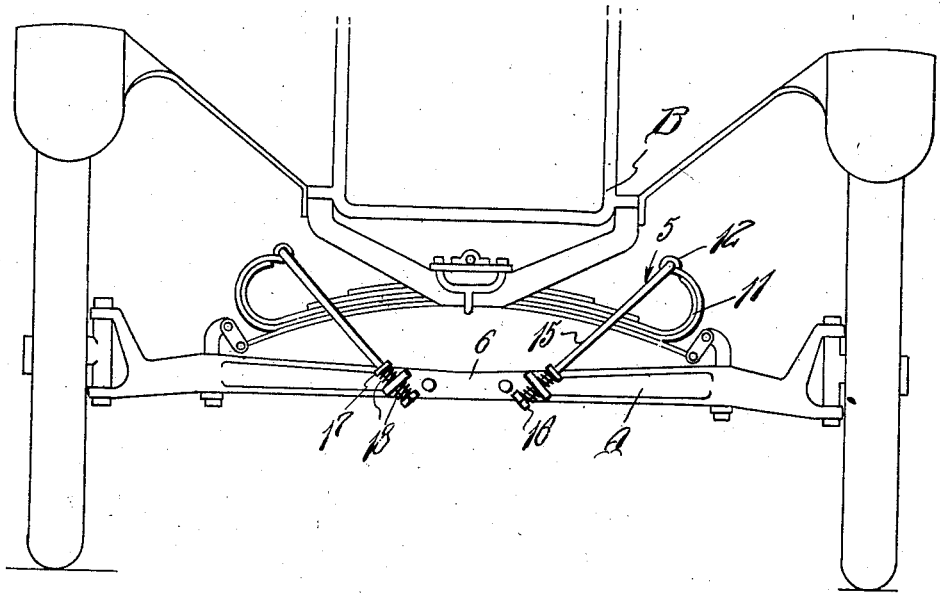
Fig. 2.
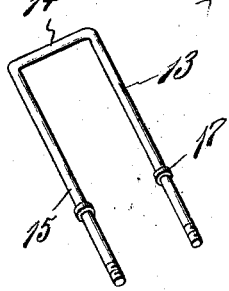
Fig. 3.
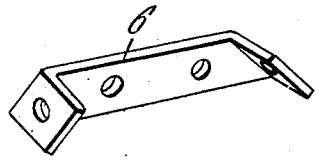
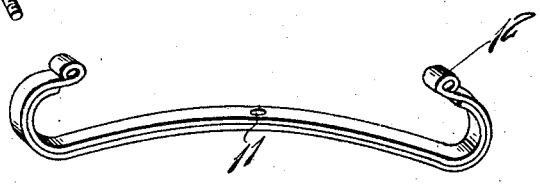
Fig. 4.
C. E. Houx
INVENTOR
BY Victor J. Evans
ATTORNEY
WITNESS:

May 25, 1926.

C. E. HOUX

SHOCK ABSORBER

Filed June 6, 1924      2 Sheets-Sheet 2

1,586,510

C. E. Houx, INVENTOR

BY Victor J. Evans ATTORNEY

WITNESS:

Patented May 25, 1926.

1,586,510

UNITED STATES PATENT OFFICE.

CHARLES EDKER HOUX, OF ERICK, OKLAHOMA.

SHOCK ABSORBER.

Application filed June 6, 1924. Serial No. 718,375.

This invention relates to shock absorbers for motor vehicles and has for its object the provision of a device of the above stated character wherein all undue shocks caused by the travel of the vehicle over rough roads will be readily absorbed, and thus eliminating all sense of discomforts to the occupants of the vehicles.

The invention also aims to provide a novel construction and arrangement of parts to facilitate a quick and secure connection of the shock absorber to both the front and rear portions of a motor vehicle and one so connected with certain leaves of the vehicle spring to permit of the shock absorber to be connected with the springs of the vehicle in an expeditious and convenient manner.

With the above and other objects in view the invention further includes the following novel features and details of construction to be hereinafter more fully described, illustrated in the accompanying drawings, and pointed out in the appended claims.

In the drawings:—

Figure 1 is a front elevation of a motor vehicle with the shock absorber installed on the front axle of the vehicle.

Figure 2 is a perspective view of the link arm.

Figure 3 is a perspective view of the clip.

Figure 4 is a perspective view of the leaves of the spring with which the shock absorber is connected.

Figure 6:
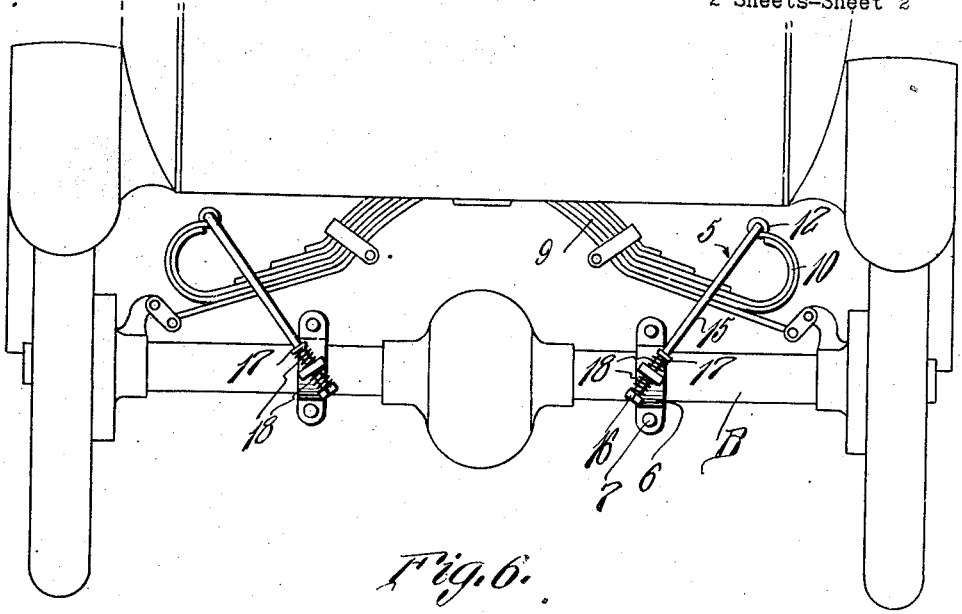
Figure 6 is a rear view of a portion of a motor vehicle with the shock absorber mounted on the rear axle of the vehicle.
Figure 7:
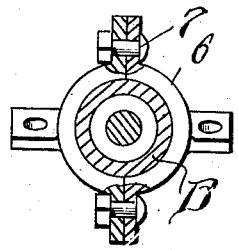
Figure 7 is a sectional view of the clip construction with which the shock absorber is connected on the rear axle.
Figure 5:
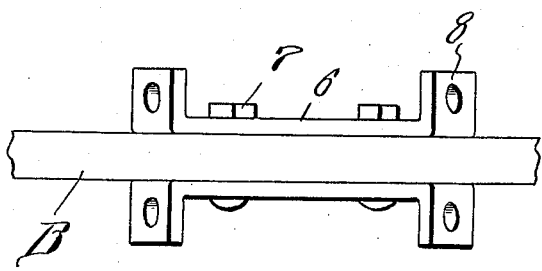
Figure 5 is a fragmentary plan view of the clip connected with a portion of the front axle.

Referring more particularly to the accompanying drawings, and in order that a clear understanding of the invention may be had, my improved shock absorber denoted generally by the reference character 5 is illustrated in Figure 1 of the drawings as applied to the front axle A of a motor vehicle B while in Figure 6 of the drawings the shock absorber 5 is shown installed on the rear axle C.

The shock absorber 5 comprises a sectional clip 6 secured to the outer and rear portions of each the front and rear axles of the vehicle, through the medium of nut and bolt connections 7. Each section of the clips for the rear axle is provided with obliquely disposed apertured lugs 8 and the ends of the clips for the front axle are also provided with like lugs 8. The purpose of such lugs will be hereinafter more fully explained.

It will be observed from Figures 1 and 6 of the drawings that in order to utilize a shock absorber of the construction disclosed, certain of the leaves of the leaf springs 9 have their extremities bent inwardly and upwardly as denoted by the character 10 and the terminals of the latter referred to portions of the sections 11 of the leaf spring 9 are provided with eyes 12.

In order that connection with the curved extremities 10 of the leaf spring sections 11 may be had with the axles of the vehicle, I employ a U-shaped connecting link 13 comprising a straight connecting portion 14 and spaced parallel limbs 15, the terminals of the limbs are threaded for the reception of nuts or other suitable stops 16. Each of the parallel limbs 15 of the connecting link 13 is provided with a flange 17, and this flange serves as an abutment for one of the pairs of coil springs 18, the latter encircling the limbs 15. As better shown in Figures 1 and 6 of the drawing, the springs when mounted for use have their meeting terminals abutting with the surface of the apertured lugs 8, and the outermost coil spring engages with the stop or nut 16. From this construction it will be observed that the shock is taken care of and the rebound of the springs effected in an expeditious manner. In assembling the shock absorber on the vehicle, the connecting portion 14 of the connecting link 13 is pivotally mounted in the eyes 12 of the curved extremities 10 of the leaf spring sections 11, positioning the limbs 15 of the connecting link in straddling relation with respect to the spring 9 and axles of the vehicle. The connecting links are swung to assume an upwardly and outwardly diverging position with respect to one another and the threaded extremities of each link is thence passed through the apertures of the lugs 8 of the clips 6 and retained thereto through the medium of the nuts 16. It will be observed when any undue shock occurs by the travel of the vehicle over rough roads, the springs will yield slidably operating the limbs 13 through the apertures of the lugs 8 and after the vehicle has passed over the obstruction in the road, a rebound will occur and bring the nuts 16 against the faces of the lugs and by so doing imparts a rebounding movement to the vehicle or spring.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention what I claim as new is:—

1. A shock absorber for motor vehicles comprising clips adapted for connection with the front and rear axles of a motor vehicle, lugs formed on said clips, U-shaped connecting links including straight medial portions and spaced parallel limbs, the straight medial portions of the connecting links having pivotal connection with upturned ends of certain of the leaves of the vehicle springs, the spaced parallel limbs of the connecting links being slidably mounted in the lugs of the clips, and stops connected with the extremities of the limbs of the connecting links.

2. A shock absorber for motor vehicles comprising clips adapted for connection with the axles of a motor vehicle, obliquely disposed apertured lugs formed on said clips, U-shaped connecting links pivoted at their medial portion to the extremities of certain of the leaves of the vehicle springs, the limbs of the connecting links being slidably mounted in the apertures of the lugs and disposing the links in an upward and outward inclination with respect to the vehicle.

3. A shock absorber for motor vehicles comprising clips adapted for connection with the axles of the vehicle, obliquely disposed apertured lugs formed on said clips, U-shaped connecting links pivoted at their medial portion to the extremities of certain of the leaves of the vehicle springs, the limbs of the connecting links being slidably mounted in the aperture of the lugs and disposing the connecting links in an upward and outward inclined position with respect to the vehicle, a flange on each limb of the links and being disposed intermediate of the ends thereof, nuts threaded on the end of the limbs and coil springs surrounding the limbs between the flanges, nuts and lugs respectively.

In testimony whereof I affix my signature.

CHARLES EDKER HOUX.